United States Patent [19]
Pietsch

[11] Patent Number: 4,933,306
[45] Date of Patent: Jun. 12, 1990

[54] ARTIFICIAL PUMICE STONE

[76] Inventor: Tibor Pietsch, Santo Dominqo de Silos, 8, 28036 Madrid, Spain

[21] Appl. No.: 217,173

[22] Filed: Jul. 11, 1988

[51] Int. Cl.$^5$ .................. C03C 11/00; C03C 19/00
[52] U.S. Cl. ........................................... 501/39; 65/22
[58] Field of Search ............................. 65/22; 501/39

[56] References Cited
U.S. PATENT DOCUMENTS

| | | | |
|---|---|---|---|
| 2,233,608 | 3/1941 | Haux et al. | 501/39 |
| 3,207,588 | 9/1965 | Slayter et al. | 501/39 |
| 3,325,341 | 5/1967 | Shannon | 65/22 |
| 3,331,694 | 7/1967 | Heidrich et al. | 501/39 |
| 3,874,861 | 4/1975 | Kurz | 65/22 |

Primary Examiner—William R. Dixon, Jr.
Assistant Examiner—Melissa Bonner
Attorney, Agent, or Firm—Nixon & Vanderhye

[57] ABSTRACT

Artificial pumice is produced which comprises cellular glass bodies devoid of glass crust and with rounded edges and points, and preferably having a density between about 0.2–2.0 grams per cubic centimeter and preferably having maximum size of between about 1–30 centimeters. These glass particles are relatively lightweight and are abrasive, which regular and regulatable density, mechanical strength, cell size, and an abrasivity. Particles of waste glass (e.g. of a size up to about 1 millimeter) or vitrifiable material, are mixed with a cellulating agent such as calcium carbonate. The mixture is heated, as by disposing it on an endless refractory belt which continuously passes through a kiln at a temperature of about 700° C. or greater, to melt the particles, and to produce relatively small or large cellular glass bodies. The size of the large cellular glass bodies can be reduced to small bodies by sudden temperature change (e.g. quick cooling at a rate of between about 100°–400° C. per minute), or by mechanical action. The desired small cellular glass bodies can also be obtained by dosing the corresponding independent small portions of the mixture before the kiln process. The smaller bodies are then placed in a rotary cylinder and brought into abrasive contact with each other to remove any glass crust, dirt, etc. and round edges and points.

17 Claims, No Drawings

ARTIFICIAL PUMICE STONE

BACKGROUND AND SUMMARY OF THE INVENTION

Natural pumice stone is of volcanic origin, is abrasive, relatively lightweight, and contains solid and gaseous components. Natural pumice is useful by millenaries for treating cloth as by softening and discoloring denim, linen, and the like, for filing, for polishing, and for many other purposes. While natural pumice stone has desirable qualities of abrasivity and relatively lightweight, it also has very inconsistent quality since the size and type of the individual stones varies widely even within the same mine, and oftentimes even within the same bag from a particular location within a mine. Also, good quality pumice stone is difficult to find since many of the prime quality mines are almost exhausted, and exploitation of other mines is limited because of the location of the mines, and/or because of environmental protection regulations. Further, natural pumice stone contains up to about 70% by weight of water which adds to shipping costs. Further, the water content often diminishes during shipping and storage, and this water content variation can adversely affect the utility of the pumice stone for cloth treating processes and the like.

Artificial pumice stones are also known. Conventional artificial pumice is typically formed from expanded ceramic or expanded concrete. Artificial pumice produced in this way typically has less than desired abrasivity, and has low mechanical strength, thus being consumed quickly.

According to the present invention, artificial pumice is provided that is made of cellular glass. Cellular glass artificial pumice is very abrasive, since the glass cell walls are sharp microscopic "knives". Also, the density, mechanical strength, cell size, and abrasivity of the cellular glass pumice is precisely regulatable during the manufacture, and thus cellular glass pumice has known quality, and the quality may be optimized for each particular situation. The cellular glass pumice according to the invention also typically is dry (unless liquid is specifically introduced therein for a particular purpose), and therefore shipping weight is minimized and quality is precisely controlled when it is desired to introduce liquid into the individual stones.

Due to its high mechanical strength and other desirable properties, one kilogram of cellular glass pumice according to the invention can be substituted for 2–10 kilograms of natural pumice, or expanded ceramic or concrete pumice, thus reducing shipping and storage costs, as well as utilization costs.

Of course cellular glass per se is known, as are methods for manufacturing cellular glass products. However most known uses for cellular glass are for thermal insulation. Such cellular glass products are regular in shape, for example being cut with saws (e.g. diamond or carborundum saws). This is in clear contra-distinction to the artificial pumice stones according to the invention which are specifically irregularly shaped with open cells that provide the needed abrasivity, and with any glass crust removed. Edges and points are also rounded since sharp edges can hurt a handler's hands, or damage materials with which the pumice cooperates in use (e.g. damage the cloth during cloth treatment).

According to the invention, artificial pumice is provided comprising cellular glass bodies devoid of glass crust and with rounded edges and points, preferably having a density between about 0.2–2.0 grams per cubic centimeter and preferably having maximum size of between about 1–30 centimeters. The cellular glass bodies may be filled with a liquid, such as water, acid, or a wide variety of textile treating liquids.

The cellular glass bodies with relatively small sizes can be obtained by two methods. The first method consists of dosing relatively small independent portions of the mixture of glass particles and cellulating agent obtaining, after the kiln process, bodies with sizes near to end sizes. The second method consists in reducing larger cellular glass bodies to smaller bodies preferably by exposing the large bodies to a sudden temperature change. This may also be accomplished mechanically by compression, flexion, impact or otherwise.

Also according to the present invention, a method is provided for producing artificial pumice. The method comprises the steps of sequentially: (a) Mixing particles selected from the group essentially of glass (e.g. waste glass particles with a maximum particle size of about 1 millimeter) and vitrifiable materials, such as sand or basalt, with a cellulating agent such as calcium or magnesium carbonate. (b) Heating the mixtures to melt the particles so as to produce relatively large cellular bodies, such as by disposing the mixture on a clay covered continuous refractory belt which continuously passes into a kiln having a temperature of about 700° C. or more. (c) Reducing the size of the large cellular glass bodies to produce smaller cellular glass bodies, such as by exposing the large bodies to a sudden temperature change (e.g. cooling at a rate of between about 100–400° C. per minute), or by mechanical action (e.g. punching, compression, flexion, impacting, etc.); and (d) removing any glass crust from the smaller bodies and rounding edges and points thereof by bringing the smaller bodies into abrasive contact with each other, such as by placing them in a rotary cylinder and rotating the cylinder. Preferably an alkaline silicate, or the like, is also added to the mixture to promote sticking of the granules together, and to avoid the formation of fissures in the final artificial pumice product produced. The further step (e) of filling the smaller cellular glass bodies with liquid (as by exposing them to a vacuum, and then to a liquid) may also be practiced, as may be the further step (al) —between steps (a) and (b) — of compacting the mixture.

It is the primary object of the present invention to provide an artificial pumice with desirable properties, and a simple and effective method of production thereof. This and other objects of the invention will become clear from an inspection of the detailed description of the invention and from the appended claims.

DETAILED DESCRIPTION

In the production of artificial pumice according to the invention, the first step is typically the mixing of glass particles and a cellulating agent together. The particles preferably are waste glass, with the size of the waste glass particles a maximum of about 1 millimeter (maximum dimension). The mixture can contain some larger particles, too. However part or all of the particles can be provided by vitrifiable materials, such as sand, basalt, or the like. The cellulating agent may be selected from a wide variety of conventional cellulating agents including, but not limited to, calcium carbonate, magnesium carbonate, carbon, graphite, glyercin, current sugar, bentonite, and the like. Other materials may also be added to the mixture. For example if it is desirable to make the cellular glass pumice absorbable, talcum, calcium oxide, or like materials can be added to the mixture. Similarly, if it is desired to color the pumice, a pigment can be added to the mixture. Also, it is desirable in many circumstances to add to the mixture materials which cause the particles of the mixture to stick together, and avoid fissures in the artificial pumic produced. Such materials preferably comprise alkaline silicates, such as sodium silicate or potassium hydrate. (Sodium silicate also is a cellulating agent.) The alkaline silicates preferably are in liquid form when added to the mixture. One particularly advantageous mixture comprises about 70-98% by weight waste glass, about 0.01-20% by weight cellulating agent, and about 0-30% by weight alkaline silicate.

The mixture of glass particles and cellulating agent may be non-compacted, or may be compacted prior to further action thereon.

The mixture is heated so as to melt the glass particles and to produce relatively small or large cellular glass bodies. Heating is preferably accomplished by placing the mixture on an endless continuous refractory material belt which continuously moves through a kiln. Preferably the surface of the belt is covered with clay, or a like protective material, and the temperature in the kiln is at least about 700° C., at which temperature calcium carbonate decomposes into calcium oxide and carbon dioxide which creates cells in the melted particles, transforming the melt into small or large bodies of cellular glass. Similar action occurs with other cellulating agents.

After large cellular glass bodies are produced, they are reduced in size to produce smaller cellular glass bodies. Size reduction is accomplished without the need for abrasive extraneous tools such as diamond or carborundum saws, which are expensive and wear out relatively quickly. The larger cellular bodies are broken up into irregularly sized smaller bodies by exposing the large cellular bodies to a sudden temperature change (either heating, after solidification thereof, or quick cooling). For example, immediately after the bodies exit the kiln, they may be cooled by disposing them in a regulated temperature atmosphere so that there is a cooling rate of between about 100-400° C. per minute, which effects break up of the large cellular bodies into smaller bodies. Alternatively the bodies may be allowed to cool slowly, and then subsequently quickly heated to cause them to break up. Instead of break up by temperature, mechanical action can be used such as impacting of the large bodies, flexion, compression, or punching smaller bodies out of the large bodies with a punch.

The smaller glass bodies produced typically will have a glass crust, will have dirt, particles of clay (from the clay covering on the refractory belt), and sharp edges and points. It is necessary to remove the extraneous materials in order to provide the necessary abrasivity and for proper functioning (e.g. during textile treatment), and to round the edges and points so as not to hurt materials being treated (e.g. cloth) and in order to protect worker's hands. This is effectively yet simply, accomplished according to the present invention by bringing the smaller bodies into abrasive contact with each other. For example, the smaller cellular glass bodies may be placed in a rotary cylinder, such as a conventional metal ball mill, where the "balls" are the cellular glass bodies themselves. The cylinder is rotated a sufficient time period so as to remove the glass crust and other extraneous materials, and sufficiently round the edges and points.

The steps according to the invention are practiced so as to produce a pumice that preferably has a density of between about 0.2-2 grams per cubic centimeter. The density may be varied and precisely controlled by the amount and type of cellulating agent, the temperature at which the cellulating effect occurs, and the time for cellulating. Further, the steps of the method according to the invention preferably are practiced so that the artificial pumice produced has a size of between 1-30 centimeters (i.e. the maximum dimension of any of the smaller cellular glass bodies is between about 1-30 centimeters).

It is also possible to fill the smaller cellular bodies with a liquid, such as water, acid, or any other type of textile treating liquid. The smaller cellular glass bodies preferably are filled with water by simply introducing the cellular glass bodies into a liquid which is to be absorbed. Preferably, however, the bodies are first exposed to a vacuum in a confined area, and then the confined area is filled with liquid. Atmospheric pressure causes the liquid to be forced into the individual cells of the cellular glass bodies.

While the artificial pumice according to the invention preferably is produced as described above, it also can be made in molds as long as the final cellular glass bodies produced are devoid of glass crust with rounded edges and points, with a desired density and size.

One particular method for producing artificial pumice stones according to the invention is exemplified as follows:

EXAMPLE

Waste glass is ground in a ball mill until it has a fineness such that at least 60% passes through a sieve with 0.088 millimeter openings. 100 kilograms of the ground waste glass, 6 kilograms of 38 Baume sodium silicate, and 4 kilograms of calcium carbonate are mixed together. The mixture is distributed uniformly and continuously on a clay covering of a refractory endless belt that passes continuously in a kiln. The mixture compacted or not melts in the kiln and at least about 700° C. the calcium carbonate decomposes into calcium oxide and carbon dioxide to create cells in the melted mixture transforming it into large cellular glass bodies. The larger bodies are then placed in a controlled atmosphere so that they cool doWn suddenly (at a rate between about 100-400° C. per minute) causing them to break into smaller cellular glass bodies of between about 1-30 centimeters (maximum size). The smaller bodies produced have sharp edges, glass crust on their surface, clay, and like contaminants. In order to eliminate such irregularities and to open the cells covered by the glass crust, the smaller cellular glass bodies are placed in a rotary cylinder which is rotated a sufficient amount of time so as to cause, by mutual abrasion, rounding of the edges and points and removal of the glass crust, dirt, and the like. The final product produced is suitable for use as pumice in cloth treating procedures, and in other procedures in which pumice is utilizable.

The desired smaller cellular glass bodies can also be obtained by dosing the corresponding independent small portions of the mixture before the kiln process.

It will thus be seen that according to the present invention an effective artificial pumice is produced, in a simple, reliable, and relatively inexpensive manner. The artificial pumice according to the invention has numerous advantages over prior art artificial pumices, and even over natural pumice. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. Artificial pumice, consisting essentially of glass bodies devoid of glass crust and with rounded edges and points, having a density of between about 0.2-2.0 grams per cubic centimeter, and having a maximum size in the range of about 1 to 30 centimeters, said glass bodies being produced by heating a mixture of glass particles and a cellulating agent to produce cellular bodies including cellular bodies of sizes larger than said maximum size, reducing the size of said larger cellular bodies to produce cellular glass bodies in said maximum size range, removing any glass crust from small glass bodies and rounding the edges and points thereof.

2. Artificial pumice as recited in claim 1, wherein said reducing of the size of said larger cellular bodies to produce cellular glass bodies in said maximum size range is achieved by a sudden temperature change.

3. A method of producing artificial pumice consisting essentially of cellular glass bodies having a density of between about 0.2-2.0 grams per cubic centimeter and a maximum size in the range of about 1 to 30 centimeters, said method comprising the steps of sequentially:
   (a) mixing particles selected from the group consisting of glass and vitrifiable materials with a cellulating agent to produce a mixture;
   (b) heating said mixture so that said particles melt and produce cellular glass bodies including cellular glass bodies having a size larger than said maximum size;
   (c) reducing the size of said larger cellular glass bodies to produce smaller bodies in said maximum size range; and
   (d) removing any glass crust from smaller bodies and rounding edges and points thereof by bringing the smaller bodies into abrasive contact with each other.

4. A method as recited in claim 3, wherein step (a) is practiced by mixing the particles and cellulating agent with a material facilitating sticking together of the granules, and minimizing fissures in the pumice produced.

5. A method as recited in claim 3, wherein step (a) is practiced by mixing particles of water glass with a cellulating agent.

6. A method as recited in claim 5, wherein in step (a) is further practiced by mixing glass particles having a size up to about 1 millimeter with the cellulating agent.

7. A method as recited in claim 3, wherein step (a) is practiced by mixing together about 70-98% by weight glass, 0.01-20% by weight cellulating agent, and 0-30% by weight alkaline silicate.

8. A method as recited in claim 3, wherein step (c) is practiced by exposing the large cellular glass bodies to a sudden temperature change.

9. A method as recited in claim 8, wherein step (c) is practiced by cooling the glass bodies at a cooling rate of between about 100-400° C. per minute.

10. A method as recited in claim 3, wherein step (c) is practiced by reducing the larger cellular glass bodies to said smaller bodies by mechanical action.

11. A method as recited in claim 10, wherein step (c) is practiced by punching the smaller bodies from the larger cellular glass bodies.

12. A method as recited in claim 3, wherein step (d) is practiced by rotating the smaller bodies together in a rotary cylinder.

13. A method as recited in claim 3 comprising the further step (e) of filling the smaller cellular bodies with liquid.

14. A method as recited in claim 13, wherein step (e) is practiced by exposing the smaller cellular bodies to a vacuum, and then exposing the bodies to liquid so that the liquid takes the place of gas evacuated from the smaller cellular bodies.

15. A method as recited in claim 3 comprising the further step (a1), between steps (a) and (b), of compacting the mixture.

16. A method as recited in claim 3, wherein step (b) is practiced by distributing the mixture continuously or discontinuously on a refractory endless belt, and passing the belt continuously in a kiln at a temperature about 700° C. or greater.

17. A method of producing artificial pumice consisting essentially of cellular glass bodies having a density of between about 0.2-2.0 grams per cubic centimeter and a maximum size in the range of about 1 to 30 centimeters, said method comprising the steps of sequentially:
   (a) mixing particles selected from the group consisting of glass and vitrifiable materials with a cellulating agent to produce a mixture;
   (b) heating said mixture so that said particles melt and produce cellular glass bodies including cellular glass bodies having a size larger than said maximum size;
   (c) obtaining bodies of artificial pumice of said maximum size by preparing independent portions of said particles and said cellulating agent before the practice of step (b); and
   (d) removing any glass crust from smaller bodies and rounding edges and points thereof by bringing the smaller bodies into abrasive contact with each other.

* * * * *